United States Patent
Demoise, Jr.

[11] Patent Number: 6,039,155
[45] Date of Patent: Mar. 21, 2000

[54] DISC BRAKE

[75] Inventor: Thomas Edwin Demoise, Jr., Osceola, Ind.

[73] Assignee: Robert Bosch Technology Corporation, Broadview, Ill.

[21] Appl. No.: 09/049,453

[22] Filed: Mar. 27, 1998

[51] Int. Cl.[7] ............................................. F16D 65/38
[52] U.S. Cl. ...................................... 188/73.39; 188/370
[58] Field of Search ............................ 188/73.39, 73.41, 188/73.42, 73.43, 73.46, 73.47, 369, 370

[56] References Cited

U.S. PATENT DOCUMENTS

| | | | |
|---|---|---|---|
| 4,044,864 | 8/1977 | Karasundani | 188/73.3 |
| 4,072,215 | 2/1978 | Burgdorf et al. | 188/72.4 |
| 4,219,106 | 8/1980 | Lupertz et al. | 188/73.6 |
| 5,022,500 | 6/1991 | Wang | 188/73.31 |
| 5,025,897 | 6/1991 | Hirashita et al. | 188/73.38 |
| 5,103,939 | 4/1992 | Schroeter | 188/72.4 |
| 5,111,914 | 5/1992 | Thiel et al. | 188/73.34 |
| 5,551,537 | 9/1996 | Mery et al. | 188/73.39 |
| 5,588,508 | 12/1996 | Le Deit | 188/73.31 |

FOREIGN PATENT DOCUMENTS

| | | |
|---|---|---|
| 0 352 559 | 7/1989 | European Pat. Off. . |
| 1029825 | 5/1963 | United Kingdom . |

*Primary Examiner*—Christopher P. Schwartz
*Assistant Examiner*—Bradley T. King
*Attorney, Agent, or Firm*—Lee H McCormick Jr; Warren Comstock

[57] ABSTRACT

A disc brake (10) with an anchor (12) fixed to a housing. The anchor (12) has non-symmetrical first (18) and second (20) rails which align first (22) and second (24) friction pads with a rotor (26). The first rail (18) has first (32) and second (34) sections with constraining surfaces (48,48') thereon separated from first bearing surfaces (50,50') by a first groove (44,44'). The second rail (20) has first (36) and second (38) sections with aligning surfaces thereon (55,55') separated from second bearing surfaces (60,60') by a second groove (53,53'). The first bearing surfaces (50,50') have a first complementary relationship with respect to aligning surfaces (55,55') and the second bearing surfaces (60,60') have a second angled complementary relationship with respect to the constraining surfaces (48,48'). The first (22) and second (24) friction pads (24) each have a carrier member (62,62') with a first projection (64,64') that respectively contact the constraining surface (48,48') along a first line of tangency in the first sections (32,34) of the first rail (18) and a second projection (68,68') along a second line of tangency in the first section (36,38) of the second rail (20). A spring (88) engages the first (62) and second (62') carrier members to sustain the second line of tangent contact with the second bearing surface (60,60'). The first (22) and second (24) friction pads on being moved into engagement with the rotor (26) produce a braking force to effect a brake application. The braking force causes the carrier members (62,62') to pivot about the first point of tangency engagement on the constraining surfaces (48,48') and transmit one half of the braking force into the first rail (18) and the other half of the braking force into the second bearing surfaces (60,60') through the second line of tangency during a brake application.

14 Claims, 4 Drawing Sheets

5,039,155

DISC BRAKE

This invention relates to a disc brake for a vehicle wherein braking forces are equally shared by non-symmetrical first and second rails of an anchor member during a brake application.

BACKGROUND OF THE INVENTION

Disc brakes of the spot-type wherein two support members which are spaced apart from each other with first and second friction pads slidably guided on the support during a brake application are known in the prior art. In particular U.S. Pat. Nos. 4,044,864; 4,219,106; 4,335,806 and 5,551,537 disclose such disc brakes wherein first and second friction pads having a carrier members which are retained in first and second rails on an anchor to distribute frictional forces during a brake application. To improve the distribution of a brake force, U.S. Pat. Nos. 5,111,914 and 5,558,805 disclose structure wherein carrier members and rails having matched corresponding concave and convex surfaces through which brake forces are transmitted during a brake application. However, the distribution of the frictional forces in such disc brakes is dependent on dimensional tolerances of the carrier members and the rails such that in practice it is difficult to manufacture disc brakes wherein equal distribution of the friction forces occurs through each rail.

SUMMARY OF THE INVENTION

A primary object of the present invention is to provide a disc brake with structure to substantially transmit equal forces into a support member through lines of tangency contact created on first and second rails during a brake application.

According to this invention, an anchor for a disc brake having non-symmetrical first and second rails is fixed to a housing. The first rail has first and second sections each of which have a constraining surface separated from a first bearing surface. The second rail has first and second sections each of which have an aligning surface separated from a second bearing surface. The constraining surface and aligning surface are non-symmetrical while the first bearing surface is located in angled complementary relationship with respect to the aligning surface and the second bearing surface is located in a angled complementary relationship with respect to the constraining surface. The first and second rails align first and second friction pads with a rotor. A first carrier member for the first friction pad has with a first projection which contacts the constraining surface only along a line of tangency in the first section of the first rail and a second projection which contacts the second bearing surface only along a line of tangency in the first section of the second rail. A second carrier member for the second friction pad has a first projection which only contacts the constraining surface along a line of tangency in the second section of the first rail and a second projection which only contacts the second bearing surface along a line of tangency in the second section of the second rail. A spring engages the first and second carrier members to sustain the line of tangent contact between the second bearing surface in the second rail. The first and second friction pads on being moved into engagement with the rotor produce a brake force in effecting a brake application. The line of tangency contact assures that the brake force is uniformly communicated through the first and second carrier members into the anchor during a brake application.

An advantage of the disc brake of this invention resides in the distribution of a braking force generated during a brake application through first and second lines of tangent contact between a carrier member and an anchor during a brake application.

A further advantage of this brake system of this invention is provided by a disc brake wherein friction pads are constrained by a first rail while resiliently urged into engagement with an angled bearing surface on a second rail such that substantially equal forces are communicated through carrier members into a fixed support during a brake application.

DETAILED DESCRIPTION

Figure 1:
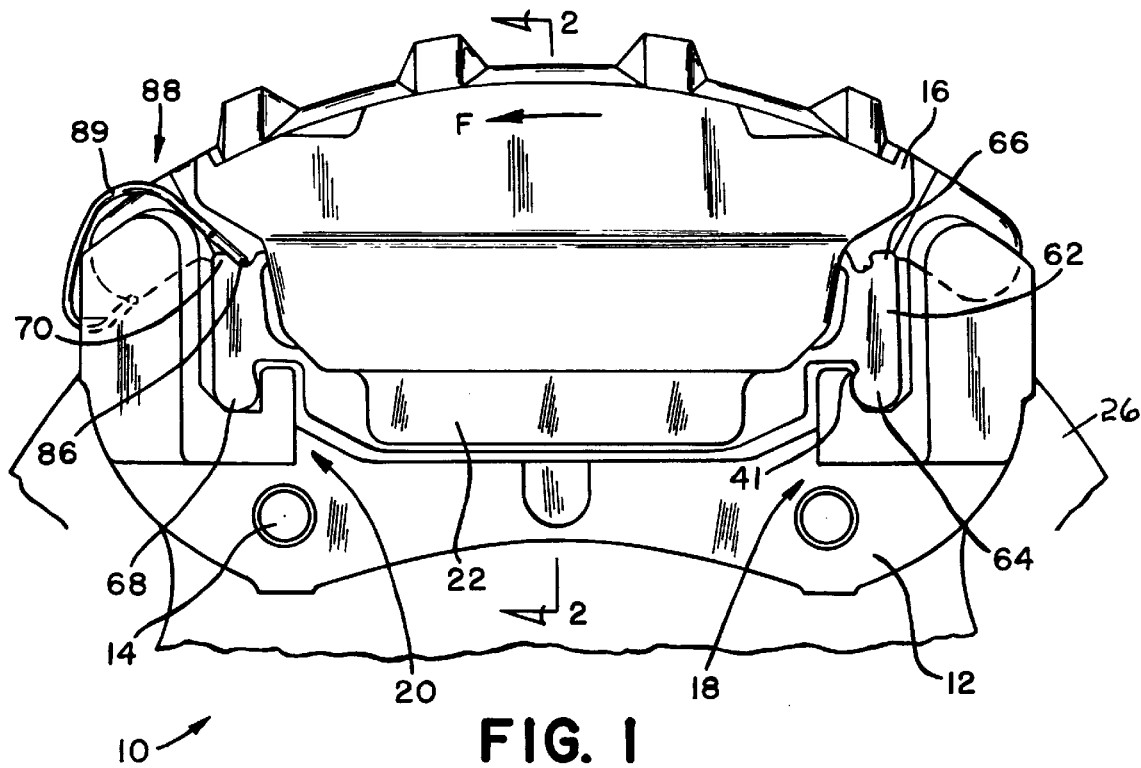
FIG. 1 is a schematic illustration of a brake having rails and corresponding carrier members for a friction pad made according to the principals of the present invention.
Figure 2:
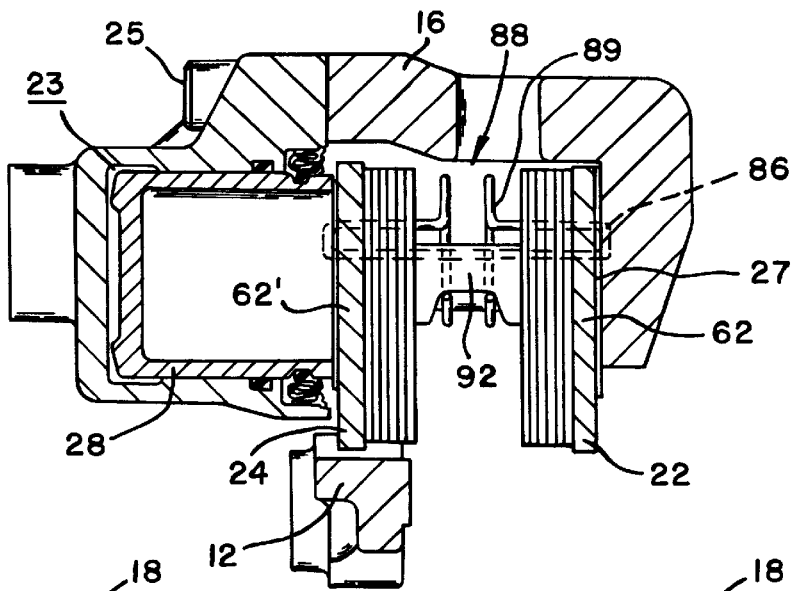
FIG. 2 is a view taken along line 2—2 of FIG. 1.
Figure 3:
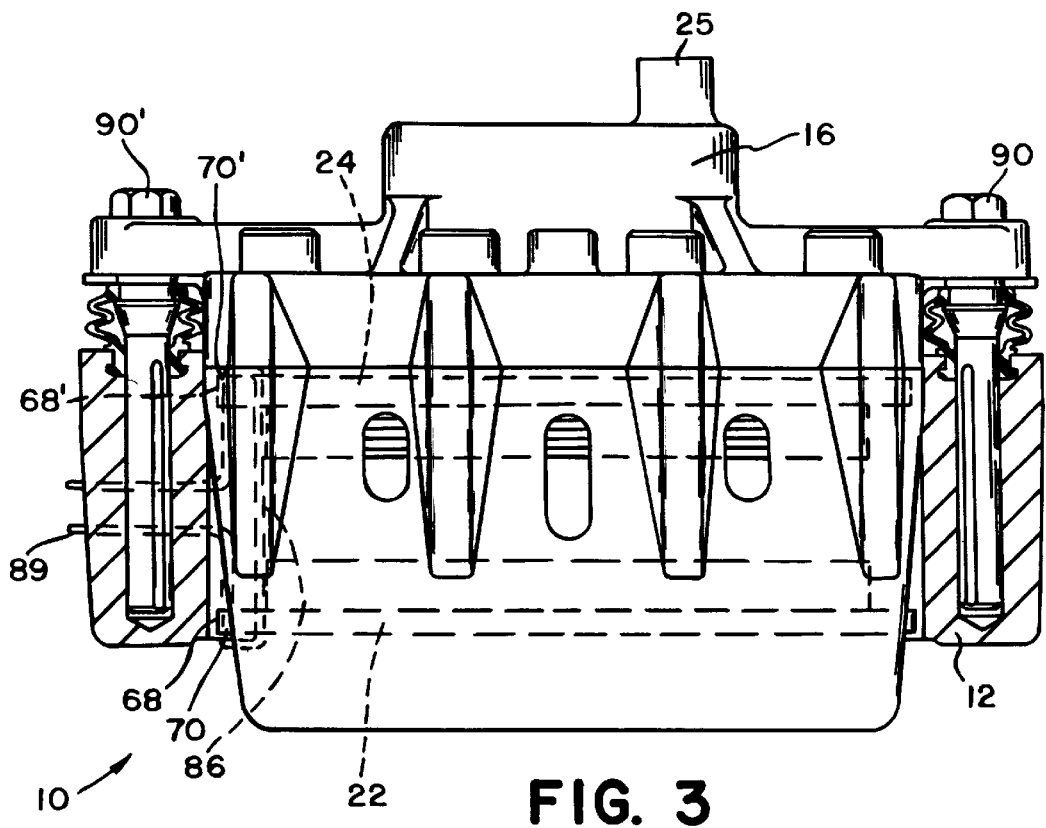
FIG. 3 is a top plan view of the disc brake of FIG. 1.

While the invention could be adapted for a fixed caliper disc brake, the disc brake 10 as shown in FIGS. 1 and 3 is of a floating caliper spot-type for use in a brake system of a vehicle. The disc brake 10 includes an anchor 12 which is fixed to the housing 14 and a caliper 16 which is mounted to slide in response to pressurized fluid being supplied to an actuation chamber 23, see FIG. 2, to effect a brake application. Anchor 12 includes a first rail 18 with two spaced apart support members 32 and 34 and a second rail 20 with two spaced apart support members 36 and 38, see FIG. 5. The first 18 and second 20 rails guide and support a first friction pad 22 and a second friction pad 24 located on opposite sides of a rotor 26. To effect a brake application, pressurized fluid is supplied to chamber 23 through port 25. The pressurized fluid acts on a piston 28 to move the first friction pad 22 into engagement with rotor 26 and acts on caliper 16 to move the second friction pad 24 into engagement with the rotor 26 to develop a corresponding brake force. The first 18 and second 20 rails hold the first 22 and second 24 friction pads in a parallel relationship with rotor 26 such that friction material associated therewith uniformly contacts the rotor during a brake application and brake forces are equally transmitted into the anchor 12.

Figure 9:
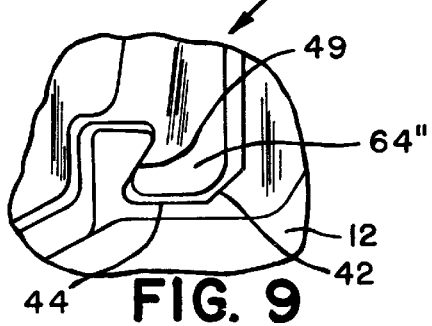
FIG. 9 is another embodiment of a constraining surface for the first rail of the anchor of FIG. 1.
Figure 10:
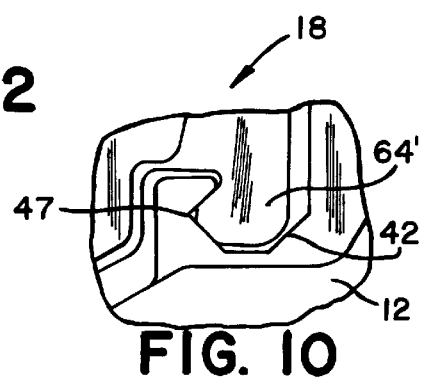
FIG. 10 is still a further embodiment of a constraining surface for the first rail of the anchor of FIG. 1.
Figure 6:
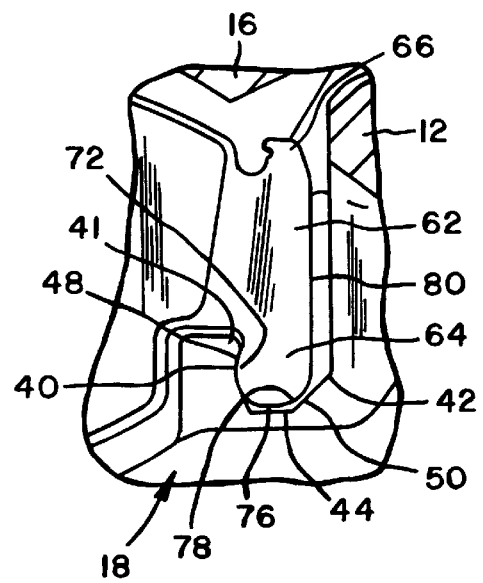
FIG. 6 is an enlarged view of the circumscribed section 6 of FIG. 4.

In more particular detail, the first 32 and second 34 support members of the first rail 18 of anchor 12 each have a first surface 40 which is separated from a second surface 42 by a first groove 44, see FIG. 6. The constraining or first surface 40 which as shown in FIG. 6 as having a concave shape 48 could have a flat shape 49 located in a plane having an acute angle with respect to a radial line extending from the axis of rotation of rotor 26 or as illustrated in FIG. 9, a pointed groove 47 as illustrated in FIG. 10 under some operational conditions. Second surface 42 provides a bearing surface 50 which is located in an angled plane with respect to a radial reference extending from the axis of rotation of rotor 26. The angled plane of bearing surface 50 being selected to functionally communicate a component of a developed braking force into anchor 12.

Figure 7:
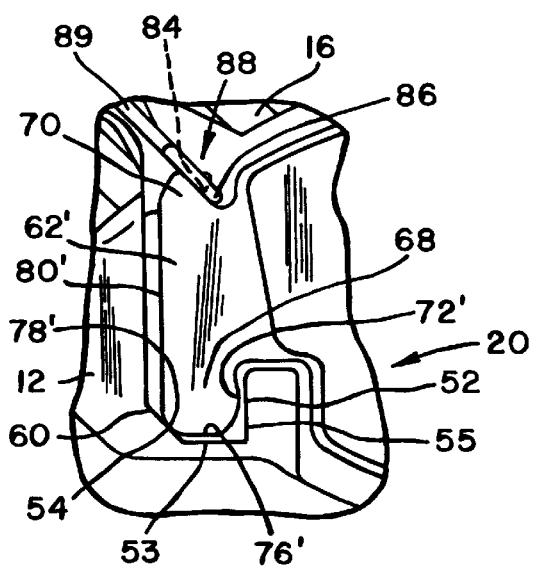
FIG. 7 is an enlarged view of the circumscribed section 7 of FIG. 4.

The first 36 and second 38 support members of the second rail 20 of anchor 12 each have an aligning or first surface 52 separated from a second surface 54 by a first groove 53, see FIG. 7. The first surface 52 has a retaining shape 55 thereon which is essentially parallel with a radial line of the axis of rotation of rotor located midway between the first 18 and second 20 rails. The second surface 54 provides a bearing surface 60 thereon which is located in an angled plane with respect to a radial reference extending from the axis of rotation of rotor 26. The angled plane of bearing surface 60 being selected to functionally communicate a component of a developed braking force into anchor 12.

Constraining surface 40 and bearing surface 60 have a first complementary relationship such that one half of a brake force developed during a brake application is transmitted into each rail 18 and 20 when a vehicle is moving in a forward direction while aligning surface 52 has a different second complementary relationship with bearing surface 50 such that one half of a brake force developed during a brake application is transmitted into each rail 18 and 20 when a vehicle is moving in a reverse direction.

The first 22 and second 24 friction pads are identical and in this description only friction pad 22 will be described in detail. However, when necessary, an ' is used with a number used to describe friction pad 22 when identical components are used in friction pad 24.

Friction pad 22 has a first carrier member 62 with first and second ends thereon. The first end has a first projection 64 and a first ear 66 extending therefrom while the second end has a second projection 68 and a second ear 70 extending therefrom, see FIG. 4.

The first 64 and second 68 projections are identical and as best illustrated in FIGS. 6 and 7 have a first section 72 has a curved shape (as shown a convex shape) which transitions into a second section 76 with a flat shape which transitions into a third section 78 with a curved shape (as shown a convex surface) which transitions into a fourth section 80 with a flat shape.

The curved shape of the first section 72 is designed to always engage the constraining surface 48 on the first rail 18 in a line of tangency contact. This is achieved since the curved shape of the first section 72 and constraining surface 48 have different shapes that are designed to never complement each other. Similarly, the curved shape of the third section 78' is designed to always engage a bearing surface 60 in the second rail 20 or bearing surface 50 in the first rail 18 in a line of tangency contact.

Ear 70 on carrier 62 and ear 70' on carrier 62' respectively have a groove 84,84' thereon. Grooves 84,84' receive a first loop 86 of a spring 88. Spring 88 has a second loop 89 which snaps over a lip 92 on anchor 12, see FIG. 2, to provide a force which continually urges the curved sections 78' on second end of the second projection 68 as viewed in FIG. 7 into engagement with bearing surface 60,60'.

Method of Assembly

Figure 5:
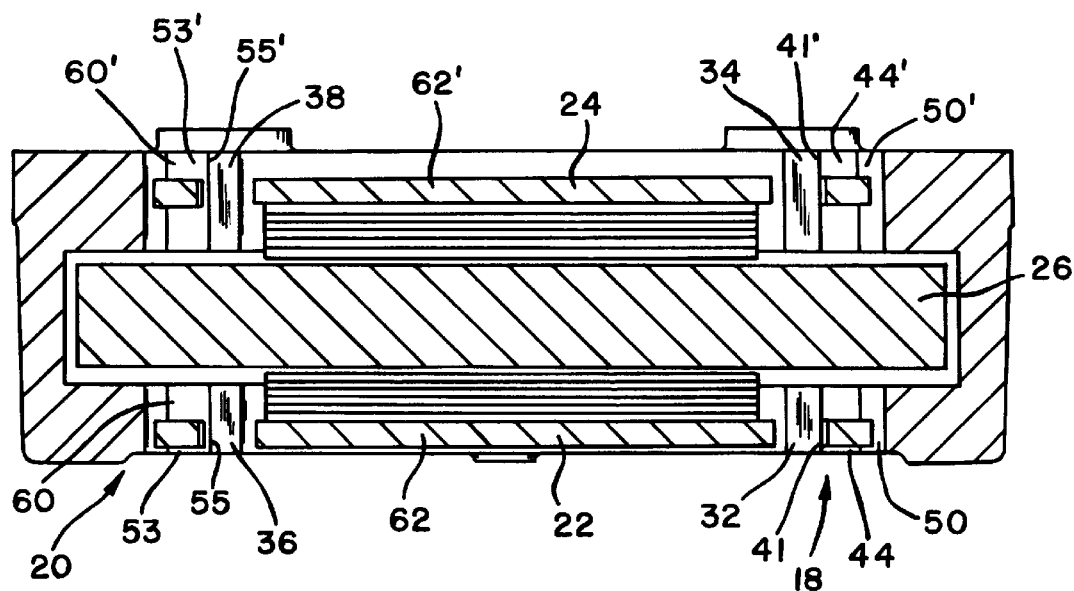
FIG. 5 is a view taken along line 5—5 of FIG. 4.

The first 22 and second 24 friction pads are located on anchor 12 of the disc brake 10 in this invention in the following manner:

Caliper 16 is rotated about pin 90 to expose the first 18 and second 20 rails as shown in FIG. 5. The first friction pad 22 is located on one side of rotor 26 (outboard side as shown in FIG. 2) such that the first projection 64 is positioned on support member 32 (the first section) of the first rail 18. Groove 44 has a width such that curved shape of the first section 72 on the first projection 64 moves past lip 41 and is pulled into line of tangency contact with the first or constraining surface 48. The curved surface 72' on the second projection 68 easily passes over aligning surface 52 on the second rail 20 and curved surface 78' is brought into engagement with bearing surface 60 of support member 36 (the first section) of the second rail 20.

Thereafter, the second friction pad 24 is located on the other side of rotor 26 (inboard side as shown in FIG. 2) such that the first projection 64' is positioned support member 34 (the second section) of the first rail 18. Groove 44' has a width such that curved shape of the first section 72' on the first projection 64' moves past lip 41' and is pulled into line of tangency contact with the first or constraining surface 48'. The curved surface 72' on the second projection 68 easily passes over aligning surface 52' on the second rail 20 and curved surface 78' brought into engagement with bearing surface 60' of support member 38 (the second section) of the second rail 20.

Loop 86 of spring 88 is brought over ears 84,84' and the end coil of loop 89 is snapped over lip 92. Spring 88 provides a force which continually urges the curved section 78' on the second projections 68,68' into a tangential line of contact engagement with bearing surfaces 60,60' in support members 36 and 38 of the second rail 20.

Thereafter, the caliper 16 is affixed to the anchor 12 by bolt 90' such that the first friction pad 22 is positioned between face 27 of caliper 14 and the outboard side of rotor 26 while the second friction pad 24 is positioned between piston 28 and the inboard side of rotor 26, see FIG. 5.

Mode of Operation of the Invention

As illustrated in FIGS. 1, 4, 6 and 7, the disc brake 10 is shown as functioning when a vehicle is moving in a forward direction.

In response to an operational input, pressurized fluid is supplied to chamber 23 to effect brake application. The pressurized fluid simultaneously acts on piston 28 to move the inboard friction pad 24 toward rotor 26 and caliper 16 to move the outboard friction pad 22 toward rotor 26.

Figure 4:
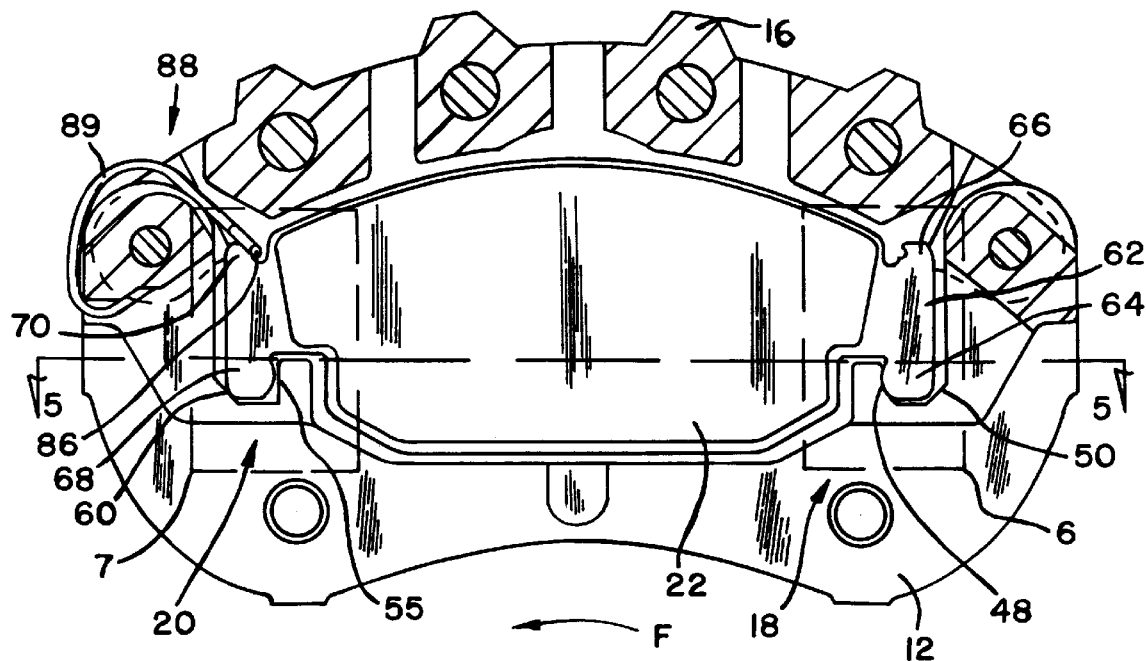
FIG. 4 is a partial sectional view showing a relationship between friction pads and anchor member for the disc brake of FIG. 1 during a brake application when a vehicle is traveling in a forward direction.

With the vehicle moving in a forward direction, rotor 26 turns in a direction illustrated by arrow F in FIG. 4. On engagement of friction pads 22 and 24 with rotor 26, a braking force is created. The braking force is transmitted by the first and second carriers 62,62' through the line of tangency contact in the first 18 and second 20 rails. The constraining surfaces of support members 32 and 34 of rail 18 are located below a center of the resulting friction zone of the first 22 and second 24 friction pads and rotor 26 and as a result the braking force causes the carrier members 62,62' to pivot about the line of tangency contact on the constraining surfaces 48,48' in the first 32 and second 34 support members. As carrier members 62,62' pivot, a resultant component of the braking force is directed through the line of tangency contact on the bearing surfaces 60,60' in the first 36 and second 38 support members of the second rail 20. The slope of the bearing surface 60,60' of the second rail 20 are designed such that one half of the braking force is transmitted as a stress force into the first rail 18 and the other half is transmitted as a compression force into the second rail 20.

Figure 8:
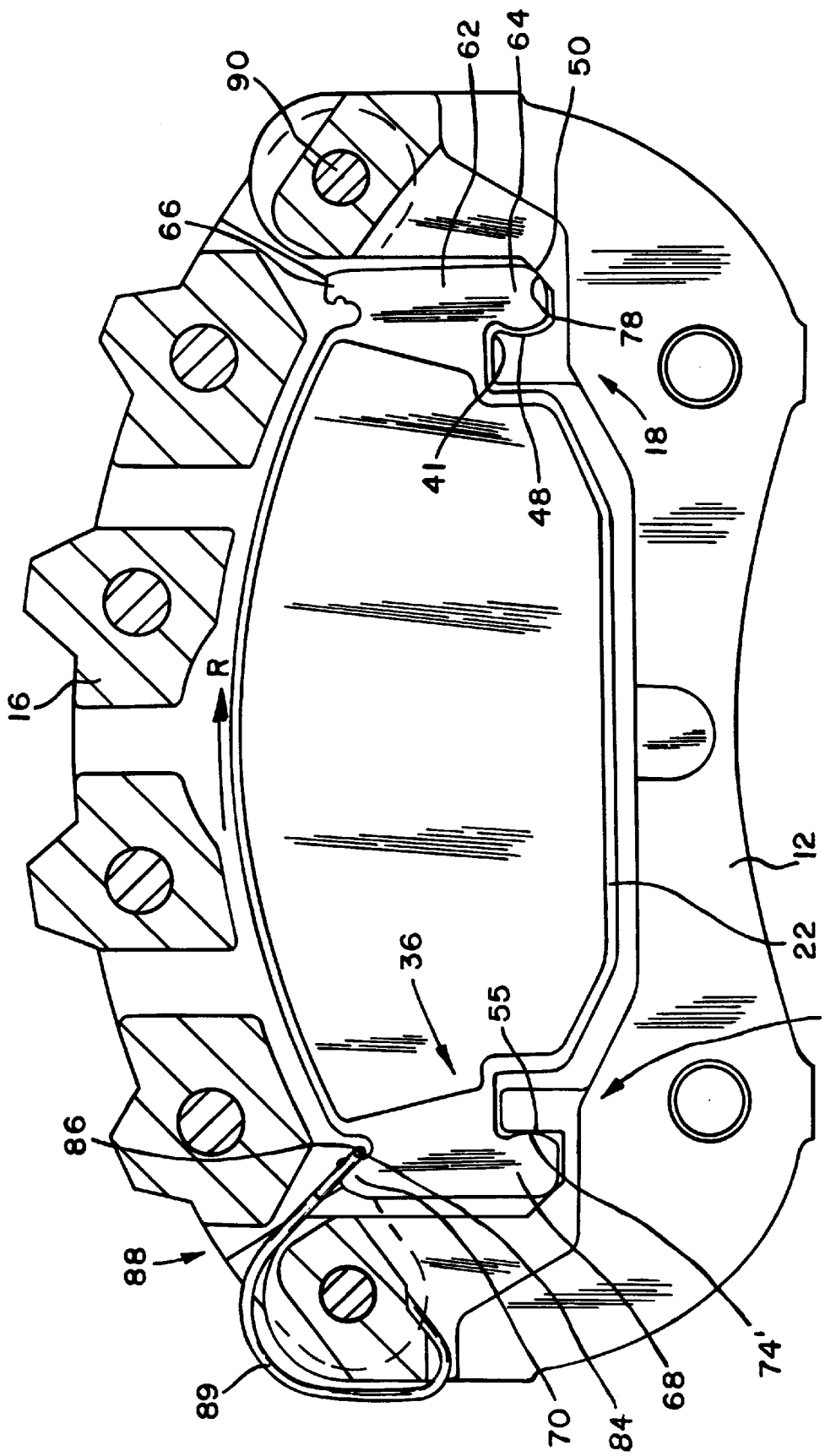
FIG. 8 is partial sectional view showing a relationship between friction pads and anchor member for the disc brake of FIG. 1 during a brake application when a vehicle is traveling in a rearward direction.

When the vehicle is traveling in a reverse direction, rotor 26 turns in a direction illustrated by arrow R in FIG. 8. When a brake application is performed to stop the vehicle traveling in a reverse direction, the disc brake 10 functions in a similar manner as described above when the vehicle in traveling in a forward direction such that friction pads 22 and 24 engage rotor 26. The resulting brake force is transmitted by the first and second carriers 62,62' through the line of tangency contact in the first 18 and second 20 rails. However, in a reverse mode of operation, the curved shape of the first surface 72' on the first and second carriers 62,62' moves into line of tangency contact with the aligning surface 52 on the first 36 and second 38 support members in the second rail 20. Spring 88 provides a force which maintains the second projection 68,68' in radial contact with the second surface 52 as the first end of the carriers 62,62' pivots about this line of tangency contact. This line of tangency contact brings curved surface 78, into engagement with bearing surfaces 50,50' in the first 32 and second 34 support members of the first rail 18. The slope of the bearing surface 50,50' in the first rail 18 is designed such that one half of a braking force is transmitted as a stress force into the second rail 20 and the other half is transmitted as a compression force into the first rail 18.

I claim:

1. A brake for a vehicle, comprising:

an anchor fixed to a support, said anchor having parallel first and second rails, said first rail having first and second sections each of which have a first surface separated from a second surface by a first groove, said second rail having first and second sections each of which have a third surface separated from a fourth surface by a second groove, said first surface having a constraining surface thereon, said second surface having a first bearing surface thereon, said third surface having an aligning surface thereon and said fourth surface having a second bearing surface thereon, said constraining surface and said aligning surface being non-symmetrical with respect to each other, said first bearing surface being located in a first angled plane and said second bearing surface being located in a second angled plane with respect to a radial reference extending from an axis of rotation, said constraining surface and second bearing surface having a first complementary angled relationship and said aligning surface and first bearing surface having a second complementary angled relationship;

a first friction pad having a first carrier member with first and second projections and first and second retaining ears extending from first and second ends of said first carrier member, said first projection contacting said first surface along a line of tangency in said first section of said first rail while said second projection contacting said fourth surface along a line of tangency in the first section of said second rail;

a second friction pad having a second carrier member with third and fourth projections and third and fourth retaining ears extending from first and second ends of said second carrier member, said third projection contacting said first surface along a line of tangency in said second section of said first rail while said fourth projection contacting said fourth surface along a line of tangency in the second section of said second rail;

a rotor located in a plane perpendicular to said first and second rails and having a peripheral surface that extends along a radial arc on said axis of rotation; and means for moving said first and second friction pads into engagement with said rotor during a brake application to develop a braking force, said first and second carrier members being stressed at said lines of tangency contact with said first rail and compressed along at said lines of tangency contact with said second rail by said braking force during forward rotation of said rotor to uniformly transmit substantially equal components of said braking force through said first and second rails into said anchor.

2. The brake as recited in claim 1 wherein said means for moving said first and second friction pads includes:

a caliper having a first section which extends over said rotor and engages said first friction pad and a second section with a bore therein; and a piston located in said bore which engages said second friction pad, said piston responding to pressurized fluid by moving said second friction pad into engagement with said rotor while said caliper moves said first friction pad into engagement with said rotor to effect said brake application.

3. The brake as recited in claim 2 further including:

spring means engaging said second and fourth ears for urging said second projection into contact with said fourth surface along said line of tangency in the first section of said second rail and fourth projection into contact with said fourth surface along said line of tangency in the second section of said second rail.

4. The brake as recited in claim 3 wherein said spring means has an end fixed to said anchor for maintaining a predetermined tension on said second and fourth ears.

5. The brake as recited in claim 4 wherein during reverse rotation of said rotor said spring means provides a constraining force as said second and said fourth projections on said first and second carrier members engage said third surface along a line of tangency in said first and second sections of said second rail while said first and said third projection engage said second bearing surface along a line of tangency in said first and second sections of said first rail to uniformly transmit braking force into said anchor.

6. A brake having an anchor fixed to a housing, said anchor having first and second rails which align first and second friction pads with a rotor, said first and second friction pads being moved into engagement with the rotor to produce a brake force and effect a brake application, said brake force being communicated through said first and second friction pads into said anchor during the brake application, said brake being characterized in that said anchor has first and second rails, said first rail having first and second sections each of which have a first surface separated from a second surface by a first groove, said second rail having first and second sections each of which have a third surface separated from a fourth surface by a second groove, said first surface having a constraining shape thereon, said second surface having a first bearing shape thereon located in a first angled plane and said fourth surface having a second bearing shape thereon located in a second angled plane with respect to a radial reference extending from an axis of rotation, said third surface having an aligning shape thereon located in a plane essentially parallel with a radial line extending from an axis of rotation of said rotor and located midway between said first and second rails, said constraining shape and said aligning shape being non-symmetrical with respect to each other, said first bearing shape being in a first angled relationship with respect to said aligning shape and said second bearing shape being in a second angled relationship with respect to said constraining shape and in that said first friction pad has a first carrier member with a first projection contacting said first surface along a line of tangency in said first section of said first rail and a second projection contacting said fourth surface along a line of tangency in the first section of said second rail to uniformly communicate substantially a first half of said brake force into an anchor during a brake application and in that said second friction pad has a second carrier with a first projection contacting said first surface along a line of tangency in said second section of said first rail and a second projection contacting said fourth surface along a line of tangency in the second section of said second rail to uniformly communicate substantially a second half of said brake force into an anchor during a brake application.

7. The brake as recited in claim 6 wherein said first and second carrier members of said first and second pads are further characterized by each having an ear aligned with said second projection.

8. The brake as recited in claim 7 further characterized by spring means connected to said ear on each of said first and second carriers for urging said second projections into a line of contract with said second and said fourth of said first and second sections of said second rail.

9. The brake as recited in claim 8 wherein said constraining shape on said first surface is characterized by a concave shape having a first diameter and in that said first projection on said first and second friction pads is characterized by a convex shape having a second diameter, said first and second diameters being different such that said line of tangent contact is permanently created on engagement of said first projection with said first surface.

10. The brake as recited in claim 8 wherein said constraining shape on said first surface is characterized by a slanted flat surface located along a plane having an acute angle with a radial projection to the axis of rotation and said first projection on said first and second friction pads is characterized by a projection which engages said slanted flat surface to transmit said braking force into said first surface at said line of tangent contact.

11. The brake as recited in claim 8 wherein said first groove in said first rail is only a connection between said first surface and said second surface and said first projection on said first and second carrier members never comes into contact with said first groove.

12. A brake having an anchor fixed to a housing, said anchor having first and second rails which align first and second friction pads with a rotor, said first and second friction pads being moved into engagement with the rotor to produce a braking force and effect a brake application, said brake force being communicated through said first and second friction pads into said anchor during the brake application characterized in that said anchor has non-symmetrical first and second rails, said first rail having first and second sections each of which have a constraining surface separated from a first bearing surface, said second rail having first and second sections each of which have an aligning surface separated from a second bearing surface, said constraining surface and said aligning surface being non-symmetrical with respect to each other, said first bearing surface having in a first angled relationship with respect to said aligning surface and said second bearing surface having in a second angled relationship with respect to said constraining surface, said first and second angled relationships being different; and in that said first friction pad has a first carrier member with a first projection which only contacts said constraining surface along a first line of tangency in said first section of said first rail and a second projection which only contacts said second bearing surface along a second line of tangency in the first section of said second rail and in that said second friction pad has a second carrier with a first projection which only contacts said constraining surface along said first line of tangency in said second section of said first rail and a second projection which only contacts said second bearing surface along said second line of tangency in the second section of said second rail, said first and second carriers pivoting about said first line of tangency contact with said constraining surface to uniformly communicate a first half of said braking force into said first rail and to uniformly communicate substantially a second half of said braking force through said second line of tangency contact with said second bearing surface into said second rail during a brake application.

13. The brake as recited in claim 12 further characterized by spring means which engage said first and second carrier members to urge said second projections on said first and second friction pads into respective line of tangency contact engagement with said second bearing surfaces in said second rail.

14. The brake as recited in claim 13 wherein said spring is characterized by a loop section which attaches to an ear on each of said first and second carrier members and a hook section, said hook section snapping onto said anchor to provide a continual force to maintain said line of tangency contact between said second projections and said second bearing surfaces.

\* \* \* \* \*